United States Patent [19]

Graham et al.

[11] Patent Number: 4,521,333

[45] Date of Patent: Jun. 4, 1985

[54] INTUMESCENT SILICATES HAVING IMPROVED STABILITY

[75] Inventors: Joseph Graham; Timothy J. Gennrich; James A. Laird, all of St. Paul, Minn.

[73] Assignee: Minnesota Mining and Manufacturing Company, St. Paul, Minn.

[21] Appl. No.: 605,053

[22] Filed: May 3, 1984

Related U.S. Application Data

[63] Continuation-in-part of Ser. No. 505,982, Jun. 20, 1983.

[51] Int. Cl.$^3$ ............................................. C09K 3/28
[52] U.S. Cl. ............................. 252/606; 106/18.12; 106/18.13; 106/18.3; 106/75; 428/921; 521/122; 521/907
[58] Field of Search ............... 106/18.12, 18.13, 18.3, 106/75; 252/311.5, 606, 609; 428/402, 921; 521/122, 140, 907

[56] References Cited

U.S. PATENT DOCUMENTS

| | | | |
|---|---|---|---|
| 3,259,536 | 7/1966 | Gaeth et al. | 161/206 |
| 3,498,807 | 3/1970 | Gresham et al. | 106/74 |
| 3,707,385 | 12/1972 | Kraemer et al. | 106/15.05 |
| 3,719,510 | 3/1973 | Temple et al. | 106/40 |
| 3,895,995 | 7/1975 | Spencer et al. | 23/302 |
| 4,118,325 | 10/1978 | Becker et al. | 106/75 |
| 4,172,110 | 10/1979 | Caesar et al. | 264/109 |
| 4,179,535 | 12/1979 | Kalbskopf et al. | 427/206 |
| 4,203,773 | 5/1980 | Temple et al. | 106/75 |
| 4,218,502 | 8/1980 | Graham et al. | 428/144 |
| 4,234,639 | 11/1980 | Graham | 428/144 |
| 4,273,879 | 6/1981 | Langer et al. | 521/91 |
| 4,297,252 | 10/1981 | Caesar et al. | 252/606 |
| 4,307,203 | 12/1981 | Blount | 521/136 |
| 4,364,210 | 12/1982 | Fleming et al. | 52/221 |
| 4,372,997 | 2/1983 | Fritze et al. | 428/144 |
| 4,396,723 | 8/1983 | Temple et al. | 501/80 |

FOREIGN PATENT DOCUMENTS

| | | |
|---|---|---|
| 0006525 | 1/1980 | European Pat. Off. . |
| 2844693 | 4/1979 | Fed. Rep. of Germany . |
| 2212826 | 7/1972 | France . |
| 2257555 | 9/1974 | France . |

OTHER PUBLICATIONS

LaCourse et al., 1967, Properties of Silica Glasses Containing Small Amounts of $B_2O_3$; Conference on Boron in Glass and Glass Ceramics, Alfred University, New York, pp. 539–548.

Horikawa et al., 1967, Drying and Water Resistance of Silicate Films, Adhesives Age, Jul.:30–34.

*Primary Examiner*—Stephen J. Lechert, Jr.
*Assistant Examiner*—Howard J. Locker
*Attorney, Agent, or Firm*—D. M. Sell; J. A. Smith; D. B. Little

[57] ABSTRACT

A fire retardant, intumescent composition is provided which comprises a mixture of alkali metal silicate, represented by the formula $M_2O:xSiO_2$ in which M is the alkali metal; an oxy boron compound selected from boric acid or salts of Group I and II elements; and water; in which the weight ratio x ranges from about 1.5 to about 4, the molar ratio of boron to M is between 0.2 and 0.9, and the water comprises about 5 to 15 weight percent of the total composition. These compositions are made by mixing an alkali metal silicate sol with a borate (e.g., boric acid) to form a gel which is dried in an oven. The resulting residue is crumbled to granules. A fire retardant which is relatively insoluble and has improved stability to long term exposure to water and humidity is formed. Various parameters (e.g., the weight ratio x, the amount of water present, and the ratio of boron to sodium) can be adjusted to control the amount of intumescence retained after exposure to water and also to control the temperature of intumescence. Granules made of these compositions have many applications, including incorporation into asphalt roofing materials.

18 Claims, 6 Drawing Figures

INTUMESCENT SILICATES HAVING IMPROVED STABILITY

CROSS REFERENCE TO RELATED APPLICATION

This application is a continuation-in-part of application Ser. No. 505,982 filed June 20, 1983.

TECHNICAL FIELD

This invention pertains to intumescent silicate fire retardant materials which can be used in compositions which insulate apertures and passages in buildings against the passage of fire and smoke, and in fire barriers and which also can be used in roofing material. Specifically, the invention relates to hydrated silicates containing borates, these compositions being resistant to degradation by moisture before they are intumesced.

BACKGROUND

Hydrated alkali metal silicates are known fire-proofing materials and are extensively employed in building construction. Under the high temperatures existing during a fire, the water of hydration is driven off causing the composition to puff, expanding by up to 25 to 40 times its original volume. Thus, when combined with fire-stop materials these materials intumesce to provide a layer of insulation against fire and smoke, said layer being full of bubbles and holes from the expansion of the water of hydration. The foaming pressure helps to seal apertures and passages in building structures making these fireproofing materials useful in fire-stops, see U.S. Pat. No. 4,364,210.

Alkali metal silicates can also be incorporated into proofing materials such as asphalt shingles in order to convert these shingles into a fire retardant Class A or B form. Alkali metal silicate particles may be placed in an asphalt layer in between the top layer of asphalt and roofing granules and the substrate of organic felt or fiberglass mat. In the event of a fire on a roof, the intumescent silicate particles expand to form a thermal barrier which retards ignition of the roofing deck.

The formation of alkali metal silicate gels by the addition of such materials as sodium aluminate or boric acid solutions to alkali metal silicates at elevated temperatures is known (see U.S. Pat. No. 4,297,252, Example 3, and U.S. Pat. No. 3,498,807, column 3, lines 42-56).

It is also known that the production of a solid, hydrated alkali metal silicate in which the moisture content is controlled can require carefully controlled drying conditions (see U.S. Pat. No. 3,895,995). Typically, alkali metal silicate suspensions or gels described in the literature are dried or cured at temperatures ranging from 90° to 136° C. and below the boiling point of the suspension or solution.

One difficulty with silicate based materials is their degradation on exposure to water or high relative humidity for extended periods of time. Water is known to leach away the alkali metal oxide from the silicate particles, reducing their ability to intumesce. Various solutions to this problem have been proposed in the past, including a coating which covers alkali metal silicate particles (see U.S. Pat. No. 4,218,502).

it is the object of this invention to provide an alkali metal silicate material which retains its intumescence after long exposure to water in order to ensure that its effectiveness as a fire protection agent will last a long time under outdoor weathering conditions.

DISCLOSURE OF INVENTION

A unique composition has been developed by combining water soluble silicates with borate compounds. When these materials are combined and then dried they yield a material with low solubility. The new material is summarized as an intumescent composition comprising a mixture of alkali metal silicate, represented by the formula $M_2O:xSiO_2$ in which M is alkali metal; at least one oxy boron compound; and water; in which x (weight ratio of silica to alkali metal oxide) ranges from about 1.5 to about 4, the molar ratio of boron to M is between about 0.2 and about 0.9, and the water comprises about 5 to 15 weight percent of the total composition.

Examples of useful alkali metal silicates are sodium silicate, lithium silicate and potassium silicate, sodium silicate being preferred. A mixture of alkali metal silicates can be used. Thus M may stand for an admixture of alkali metals in silicate form.

For purposes of this description, the term "oxy boron" or "borate" means any compound having a radical which contains boron and oxygen, such as the metaborate, tetraborate, perborate, or polyborate radicals. Examples of suitable borates are: boric acid and oxy boron compound salts of Group I and II elements, including naturally occurring borate compounds, such as borax and colemanite. By Group I and II elements, it is meant all elements in Groups IA, IB, IIA and IIB of the periodic table of elements. Some additional examples of suitable borates are calcium metaborate, magnesium borate, and zinc borate.

The temperature at which expansion or intumescence begins with these compositions can be controlled as needed for the application. Generally, the lower the concentration of water the higher is the temperature of intumescence. There is preferably about 5 to 10 weight percent water in the composition. Also, if a higher intumescence activation temperature is required, this can be accomplished by adding calcium hydroxide to the basic formulation. If a lower activation temperature is needed, borax can be used in place of boric acid as the oxy boron compound.

For cases in which the borate is the salt of an alkali metal (e.g., borax or sodium borate) the alkali metal originating from the oxy boron compound will become part of the composition, and this alkali metal is included in calculating the ratio x stated above between the silica and alkali metal.

The raw material for this invention is a solution or dispersion of an alkali metal silicate rather than an anhydrous silicate which must be hydrolyzed to impart intumescence. A gel is formed by adding an oxy boron compound and drying the mixture, resulting in a reduction of the solubility of the silicate. A typical material of this invention is made as follows: An aqueous sodium silicate solution containing 8.90 weight percent $Na_2O$ and 28.7 weight percent $SiO_2$ (silica/soda weight ratio of 3.22) is provided. Using a high shear mixer 7.7 parts by weight of boric acid are slowly added to 100 parts of the silicate solution. The resulting gel is poured into trays and dried in an oven at 350° F. (177° C.). The resulting mass is size reduced in a granulator to some convenient particle size (e.g., 16–48 mesh or 297 to 1,000 micrometers).

By example, addition of boric acid to liquid sodium silicate and drying to a water content less than 10% has resulted in a product with excellent intumescence and which could withstand one hour in boiling water. Standard silicate fire prevention compounds will lose all intumescence after exposure to boiling water for 2 minutes.

The drying temperature is usually between 125° and 210° C.

The alkali metal silicate raw material is provided as a liquid solution or dispersion, not as a solid. Particles prepared by starting with a liquid raw material can be modified by chemical addition to the silicate liquid to affect the solubility of the final product. On the other hand, to change the composition of an anhydrous material requires melting the solid silicate. Any additions to the melt which make the silicate less soluble should also affect the rate of hydration in processes such as that described in U.S. Pat. No. 4,218,502, Example 1.

The process described above makes possible a fire retardant, intumescent silicate having excellent resistance to degradation by liquid water and humidity (because of low solubility) which silicate can be incorporated into asphalt shingles to upgrade their fire rating. Granules of this invention, which have been treated to give a sufficiently high melting point, are useful as a fire retardant additive to many other products such as polyurethane foam, fire barriers used in building construction, and electrical cable protectors.

DETAILED DESCRIPTION

In the case of the preferred alkali metal silicate, sodium silicate, the weight ratio of silica to soda ($SiO_2/Na_2O$) is preferably in the range of about 2–3.75, more preferably about 2.75–3.75, 3.22 being the most preferred ratio.

Figure 2:
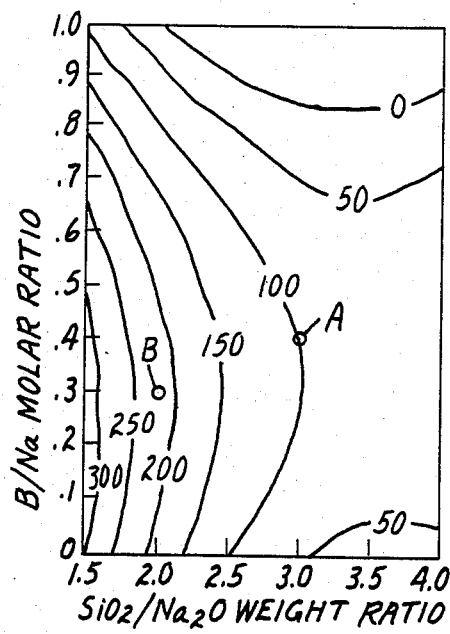
FIG. 2 is a contour plot of boron to sodium molar ratio versus silica to soda ($Na_2O$) weight ratio for various degrees of intumescence. Each contour line represents a constant degree of intumescence which would be obtained by exposing a 3 gram sample of certain compositions of this invention (made with boric acid) to a temperature of about 538° C. The degree of intumescence is measured in milliliters of volume (based on bulk density) occupied by the intumesced three gram sample. The number on each contour line corresponds to the milliliters of intumescence.

The amount of oxy boron compound (e.g., boric acid) added to insolubilize the alkali metal silicate is dependent upon the ratio of boron to alkali metal. Hydrolytic stability (i.e., the retention of intumescence after prolonged exposure to water or humidity) is affected by this ratio. This is shown graphically by FIGS. 3 and 5 which show the variation in intumescence retained by two different embodiments of this invention. A comparison of FIGS. 2 and 4, which show the dependence of intumescence on the boron to alkali metal ratio prior to exposure to water, with FIGS. 3 and 5, makes it clear that the samples having the greatest intumescence originally do not necessarily have the best retained intumescence. To achieve a high retained intumescence, the preferred boron to alkali metal molar ratio is about 0.4 to 0.7.

The preferred particle size for the intumescent composition of this invention is at least 40 micrometers in largest dimension, more preferably between about 125 and 1,000 micrometers in largest dimension. There is a relationship between particle size and intumescence. Generally, compositions having a larger particle size give greater volume expansion, i.e., the specific volume of the intumescent composition is larger for compositions of larger particle size.

The use of these intumescent compositions as fire retardants requires that they be protected from melting or shrinking due to very high temperatures (e.g., 1000° C.). Various means can be used in order to raise the melting point of the inventive compositions in order to prevent the premature destruction of the insulating foam which they form during a fire. One such technique is the addition of alumina trihydrate powder (particle size preferably less than 45 micrometers) in admixture with the intumescent silicate compositions in an amount in the range of about 10 to 50 weight percent of the total. Alumina trihydrate also has the advantage that it is nonalkaline, thus making the final composition safe to use in end products which might be degraded by alkaline materials, e.g., polyurethanes.

Another means of increasing the melting point is coating the granules of intumescent silicate with a mixture of calcium hydroxide and a metal salt of a long chain fatty acid (e.g., sodium stearate). Salts of other acids (e.g., oleic and palmitic acids) could be used. Other metals besides sodium which may be used in the metal salt are: barium, magnesium, aluminum and zinc.

Such coatings can be applied by known coating procedures. In one such procedure, the core particles are first coated with the liquid, melted fatty acid. Before this coating has cooled, powdered calcium hydroxide is mixed with the particles, becoming partially embedded in the fatty acid coating, and reacting to form the calcium salt of the acid. These types of coatings are described in more detail in U.S. Pat. No. 4,218,502 which is hereby incorporated by reference.

Another type of coating can be added to the granules of this invention which catalyzes the charring of the medium into which the granules may be incorporated (e.g., asphalt in roofing shingles). Such a coating can comprise a halogenated organic compound and an iron-containing compound adapted to react with halogen released from the halogenated organic at a temperature less than 250° C. One example of such a coating material is chlorinated paraffin containing iron oxide particles. In the range of 1 to 20 parts by weight of halogenated organic compound are used per 100 parts of silicate, and sufficient iron-containing compound is used to react with the released halogen to form iron halide which catalyzes the organic material and forms char. These catalytic coatings can be applied by blending the silicate granules with for example, 1.5 parts by weight liquid chlorinated paraffin and 6 parts by weight solid chlorinated paraffin (both chlorinated paraffins obtained as Chlorowax from Diamond Shamrock Corporation) in a blender. 35 parts by weight of iron oxide particles less than 75 micrometers in largest dimension would be added to the blender and mixed with the other contents until the mixture is uniform in color. At that point, the silicate granules would have a coating of chlorinated paraffin with iron oxide particles partially imbedded in the paraffin. One part by weight of a low-viscosity paraffinic oil may be added to the granules at this point to improve compatability with asphalt. More details on these types of coatings may be found in U.S. Pat. No. 4,234,639 which is incorporated by reference herein.

The process by which this new material is made mixes together a silicate/water solution with an oxy boron compound to form a composition which is relatively insoluble in water. This process, as well as other aspects of this invention, will be clarified by a consideration of the following examples, which are intended to be purely exemplary. For purposes of this description, intumescence has been measured by expanding 3 grams of silicate granules (about 0.3 to 1.0 millimeters in largest dimension) on a hot plate at 538° C. The volume of the mass of expanded or intumesced particles was measured by pouring them into a graduate cylinder.

Hydrolytic stability has been measured in tests designed to accelerate aging by long term leaching in water. Three grams of sample was exposed to 100 milliliters of water contained in a cup for some period of time (either 8 hours in an open cup and evaporated to dryness at about 80° C. or 24 hours in a covered container at about 80° C. in an oven). Intumescence retained was measured by expanding the thus exposed sample on a hot plate at about 538° C. and measuring the bulk volume.

EXAMPLE I

Formulation SG-109-6 was made using the general process described previously using boric acid and sodium silicate ($SiO_2/Na_2O$ ratio of 3.22) to obtain a boron/sodium molar ratio of about 0.4. This formulation was evaluated in accelerated solution tests. In these tests, 3 grams of particles were refluxed in 300 milliliters of boiling water for 1 to 6 hours and measured for retention of intumescence. After 1 hour in boiling water there was no observable hydrolytic degradation; while, after about 2 hours nearly 50% of the original intumescence was lost. By comparison, a 3 gram sample of a commercially available granular intumescent silicate (with the same $SiO_2/Na_2O$ ratio but without any borate) lost all its intumescence within 2 minutes when exposed to boiling water.

Figure 1:
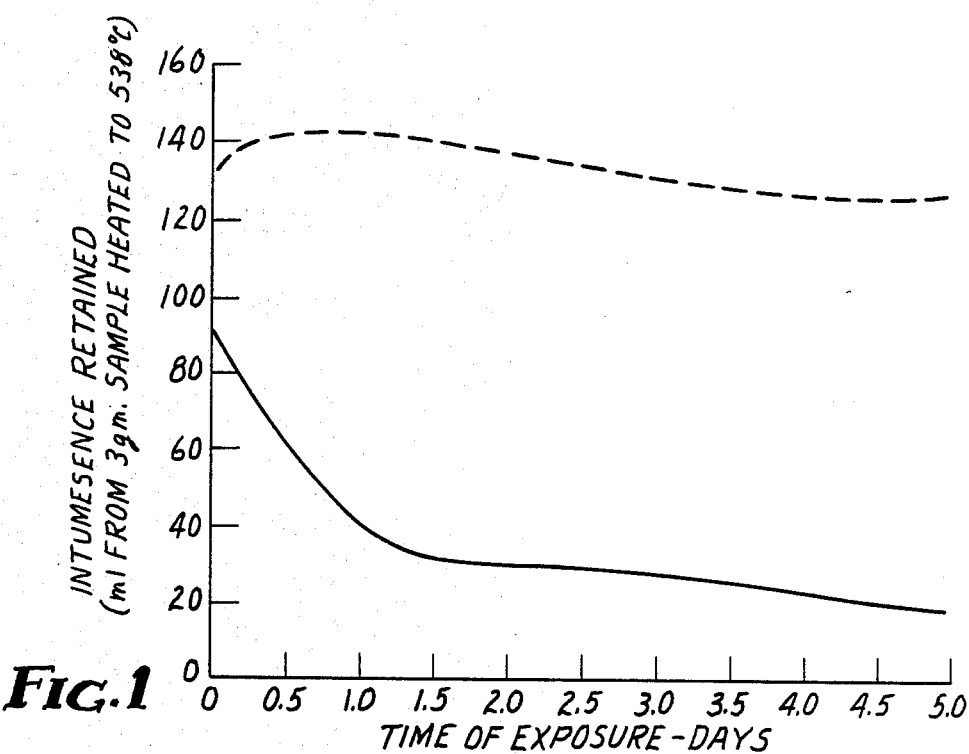
FIG. 1 is a graph of intumescence retained under humid conditions over a period of 5 days for the silicate fireproofing materials of this invention, compared to the retained intumescence for a control sample which is a commercially available silicate.

Particles of SG-109-6 were tested in a humidity chamber at about 60° C. and 95% relative humidity. The retention of intumescence by these particles is indicated in the top line of FIG. 1, whereas, the lower line plotted on FIG. 1 indicates similar data for a control sample of commercially available intumescent silicate. The control sample lost over half its intumescence in one day and was almost completely degraded after 2 days of exposure to humid conditions; whereas, SG-109-6 showed no degradation after 5 days and was found to retain 70 milliliters of intumescence after 3 weeks of exposure.

EXAMPLE II

Figure 3:
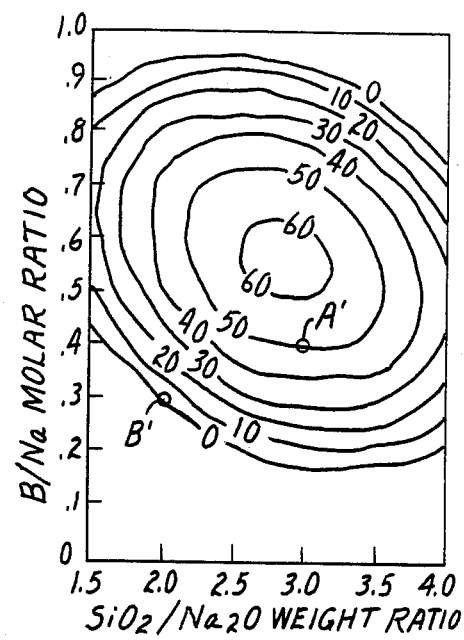
FIG. 3 is a contour plot of boron to sodium molar ratio versus silica to soda ratio for certain silicate compositions as described for FIG. 1 which have been soaked in water at about 80° C. for 24 hours and then dried. Again, each contour line represents a specified constant volume in milliliters (designated by the numbers on the contour lines) occupied by a 3 gram sample exposed to a temperature of about 538° C. This figure is some indication of the stability of the intumescent compositions.
Figure 4:
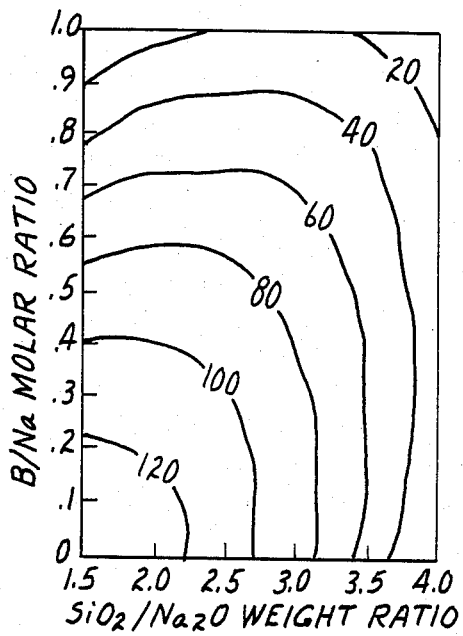
FIG. 4 is a contour plot similar to FIG. 2 except that the oxy boron compound used for these compositions was calcium metaborate rather than boric acid, as was the case for FIG. 2 and FIG. 3.

A number of tests were performed on various embodiments of the present invention for hydrolytic stability. The data on original intumescence and retained intumescence for such samples was used to generate the contour plots which appear as FIGS. 2-5. In order to aid in the interpretation of these contour plots, points A, A', B, B' have been marked on FIGS. 2 and 3. Point A on FIG. 2 indicates that an intumescence of about 100 milliliters was obtained at a silica to soda ratio of 3 and a boron to sodium ratio of about 0.4; whereas, the corresponding point, A', on FIG. 3, indicates that, after exposure to water, the same sample retained 50 milliliters of intumescence. Point B on FIG. 2 indicates that an original intumescence of about 220 milliliters would be obtained at a silica to soda ratio of 2.0 and a boron to sodium molar ratio of 0.3. However, after the accelerated aging test, Point B' on FIG. 3 shows that the same embodiment would retain none of its intumescence.

EXAMPLE III

Figure 5:
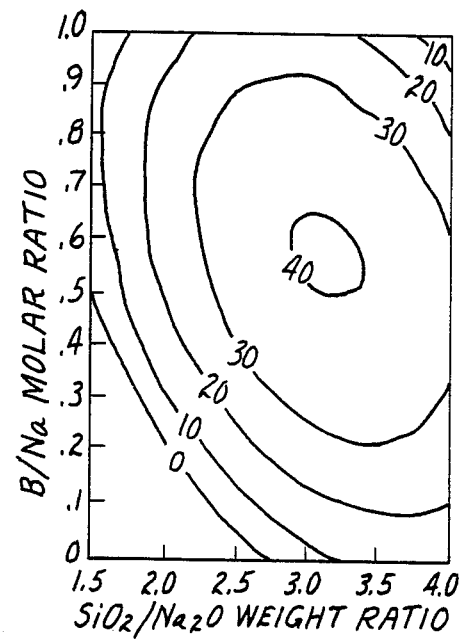
FIG. 5 is a contour plot similar to FIG. 3, except that the oxy boron compound used in the composition was calcium metaborate instead of boric acid.

For the purpose of comparison, a composition was made in accordance with the teachings of U.S. Pat. No. 4,297,252 as follows: 100 parts by weight of a sodium silicate solution ($SiO_2/Na_2O$ weight ratio of 3.22, and about 35 weight percent solids) was mixed together with 32 parts by weight of sodium silicate powder (same $SiO_2/Na_2O$ ratio as before but 82 weight percent solids) to form a suspension. To this was added about 4.9 parts by weight of boric acid powder, and all the ingredients were thoroughly mixed. The resulting mixture was heated in an aluminum pan at 90° C. in an oven until the residual moisture content was about 32 weight percent. The residue was size reduced in a granulator to particles in the range of about 0.3 to 0.85 millimeters in largest dimension. A 3 gram sample of such particles was added to 100 ml of boiling distilled water. After about 1 minute, about 90% of the particles were dissolved, and the remainder would not intumesce. Another 3 gram sample was added to 100 ml of distilled water in a beaker. The beaker was covered with aluminum foil to minimize evaporation and placed in an oven at about 80° C. for 24 hours. At the end of this time, most of the particles were dissolved, and the remainder would not intumesce. This is in contrast to the hydrolytic stability of the compositions of this invention which is indicated in FIGS. 3 and 5.

EXAMPLE IV

Tests of the insulative property of the inventive compositions were conducted as follows:

1. Pads were made which comprised asphalt disposed between, impregnated in, and adhering to fibrous webs on either side of the pad. Inorganic filler particles (e.g., calcium carbonate) and intumescable silicate granules were dispersed in the asphalt along with an iron- and halogen-containing material which catalyzes the charring of the asphalt upon heating above about 175° C. (e.g. mixture of iron oxide and chlorinated paraffin). The weight ratio of calcium carbonate to asphalt was 1:1, and the ratio of intumescable silicate to asphalt was 1:2. These composite sheet materials can be made by: (a) feeding 2 fibrous webs together through nip rolls; (b) introducing into the nip of the rolls a mixture of molten asphalt and inorganic filler particles from a hopper; (c) cascading the intumescable silicate granules into the asphalt or onto the web; and (d) allowing the sheet to harden. The asphalt binds the 2 fibrous webs together and at least partially impregnates the webs. Further details on these types of material may be found in U.S. Pat. No. 4,372,997 which is incorporated herein by reference.

2. Specimen pads of such sheets were placed inside a brick chamber testing device. The chamber basically comprised a small volume surrounded and defined by fire brick. The sample could be placed flat on a bottom metal plate in which position it could be exposed to a gas (Meeker) burner flame located underneath the device. The top of the chamber was closed by an insulating material and a temperature sensor was inserted into the chamber and located near the top side of the test specimen, which in each case was about 3 millimeters thick.

Figure 6:
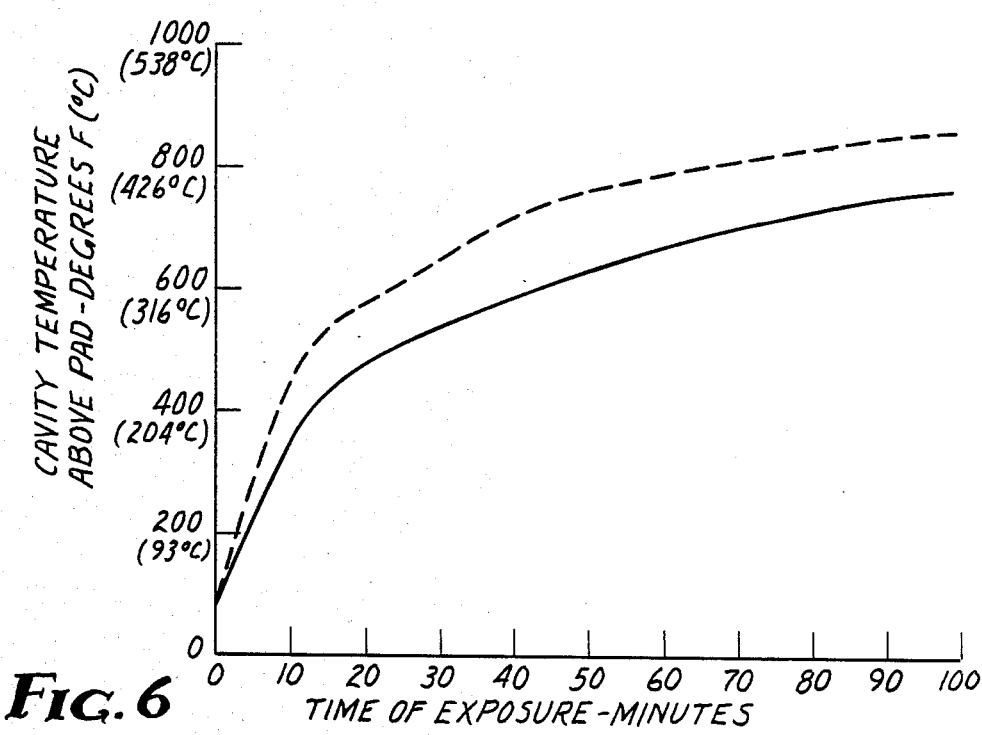
FIG. 6 is a graph of temperature versus exposure time for a silicate composition of this invention and also for a silicate composition which is commercially available. Both compositions were incorporated into an asphalt test pad which was exposed to a flame at about 1,010° C., and the temperature indicated on the vertical axis of the graph is the temperature maintained on the side of the pad opposite the side which was exposed to the flame. Thus, this graph is an indication of the insulating value of the intumescent material.

Two intumescable silicates tested for this example were: a composition of this invention to which alumina trihydrate had been added in an amount comprising about 20 weight percent of the total silicate composition in order to raise the melting point; and a control comprising a commercially available coated, hydrated sodium silicate. Pads containing these silicates were exposed to a flame of about 1,010° C. for 2 hours. FIG. 6 is a plot of the temperature rise as measured in the brick chamber for the 2 different pad constructions, the dashed line being the control and the solid line being the inventive sample. Both pads expanded by about 19 millimeters in thickness and offered good insulation. The pad containing the intumescable silicate of this invention (with alumina trihydrate) provided better insulation, since it maintained a lower temperature on the side not exposed to fire. The intumesed control sample collapsed somewhat after exposure to flame.

EXAMPLE V

A series of experiments was performed to test the effects of calcium hydroxide and borax (sodium borate) additions. Varying amounts of both agents were added to a sodium silicate solution (about 35 weight percent solids and a $SiO_2/Na_2O$ weight ratio of about 3.22). After mixing the materials, the mixture was dried in an oven at about 177° C. to a water content of about 10 weight percent. The residue was crushed to particles most of which were in the size range of about 0.3 to 0.9 millimeters in largest dimension. The intumescence of these particles was tested by expanding a 3 gram sample in an oven at about 260° C. and also on a hot plate at about 538° C. After about 10 minutes, the particles were removed, and the amount of intumescence was measured by pouring the intumesced particles into a graduate cylinder and measuring the volume of the mass. The results of these experiments are shown in Table 1 below. In the table, the term "parts" for calcium hydroxide and borax means parts by weight per 100 parts by weight of sodium silicate solution raw material.

TABLE I

| Parts Ca(OH)$_2$ | Parts Borax | INTUMESCENCE (ml of expansion) | |
|---|---|---|---|
| | | 260° C. | 538° C. |
| 2 | 5 | 60 | 170 |
| 8 | 5 | 7 | 70 |
| 2 | 15 | 53 | 183 |
| 8 | 15 | 14 | 85 |
| 5 | 10 | 19 | 124 |
| 0.8 | 10 | 89 | 208 |
| 9.2 | 10 | 8 | 67 |
| 5 | 3 | 16 | 98 |
| 5 | 17 | 26 | 110 |

It can be observed from the tabulated results that at a given temperature, increasing the calcium hydroxide concentration decreases the degree of intumescence. Also, it can be observed that in each case the degree of intumescence increased from 260° to 538° C., but the greater percentage increases were obtained at the higher calcium hydroxide concentrations. In addition, it is observed that at a given temperature and with constant calcium hydroxide concentration, the degree of intumescence increases with increasing borax concentration.

The intumescent silicate composition of this invention can also be made in various colors through the use of dyes or pigments. The colorants would preferably be added during the step in which the borate and alkali metal silicate are mixed together. Examples of suitable colorants are: iron oxides for red, brown and yellow; copper phthalocyanine dyes for blue or green; and carbon black for black.

INDUSTRIAL APPLICABILITY

These new intumescent silicates can conveniently and economically be included in asphalt roofing materials (i.e. shingles) without significant change in the standard manufacturing procedures. A small concentration of the particles can be applied per unit area of the roofing material by cascading the particles directly on to and partially imbedding them in the asphalt coating already incorporated into standard asphalt roofing material.

A typical asphalt roofing material comprises several layers: (a) a layer of roofing felt paper saturated and coated with asphalt on its top surface; (b) a second asphaltic layer applied over the layer of part (a) and onto which a layer of roofing granules is normally applied; (c) a back coating of asphaltic composition applied to the bottom of the felt paper; and (d) a dust coating of mica or similar material to make the back side of the roofing material tack-free.

The intumescent silicates of this invention would be incorporated into the roofing material by imbedding the intumescent granules in the roofing felt or by cascading them over the layer of part (a) so that they are located in between the layers of parts (a) and (b) in the final product. The concentration of intumescent granules would typically be about 4 to 20 kilograms per 10 by 10 meter section of applied roofing in order to achieve a Class A fire rating. For fiberglass mat shingles, about 1 to 2 kilograms per 10 by 10 meter section would generally be used to achieve such a rating.

The temperature at which these intumescent silicates begin to expand can be controlled to suit the application and to minimize premature expansion during processing. These new intumescent silicates have the additional advantage that, if premature expansion does occur at processing temperature rupturing any protective coating, the core particle remains essentially insoluble and is not leached out by water to form bloom on the shingle surface. By comparison, a commercially made coated silicate will prematurely expand at 200° C. in asphalt, disrupting any protective coating and leaving the particle coress unprotected from moisture.

The granules of this invention are also useful in other asphalt impregnated sheeting. For example, they may be used on asphalt impregnated rag felt or glass fiber mat which can be laminated into a fibrous or foam insulation as a moisture barrier for construction purposes.

The particles of this invention are also useful as fire retardant additives in a variety of other articles, including rigid or flexible foams, molded or sheet articles, extruded or cast film, and elastomeric articles. Such articles may be made from polyurethanes, polychloroprene, epoxy resins or polyesters. The sheet materials are preferably comprised of a polymeric binder, such as polychloroprene, which softens and chars in the presence of heat; i.e. at a temperature in the range of 100° to 200° C. Polychloroprene sheets having the granules of this invention dispersed therein may be used as fire barriers for cable penetration devices in buidling floors and walls. Such sheets could be made by mixing the fire retardant granules with the polychloroprene polymer compound in a mill or an internal mixer such as a Banbury Mixer. The mixed compound would be formed into a sheet by extrusion or calendering. Further details on the manufacture of such sheets is found in U.S. Pat. No. 4,273,879 which is incorporated by reference herein. A wide range of concentrations of the intumescent granules may be included in such products, though most often 10 to 300 parts by weight of silicate would be mixed with 100 parts by weight of polymer.

Caulks and putties may also be made incorporating particles of the inventive intumescent compositions. These are made by known techniques of mixing uncured polymer binder (e.g., polychloroprene) fillers, resins, and possibly adhesion promoters pigments and solvent (e.g., 50/50 mixture of methyl ethyl ketone and xylene) in a kneader mixer. The intumescent particles would be added during the mixing step. The manufacture of putties is explained in U.S. Pat. No. 4,273,879. Putties are generally more viscous than caulks, having a lower flow rate through a standard 0.25 (6.4 mm) inch orifice at 50 psig (345 kPa), for example less than about 150 grams per minute.

Also, the particles of the invention can be introduced into various coating materials to form fire retardant coatings. To produce paints or paintable materials, the simplest procedure is to mix the fireproofing agents of this invention as a filler or pigment to the conventional paint binder.

These particles can be added in a loose mixture with other powdered materials for fire retardant purposes.

In addition, they may be incorporated into cellular polymers or foam rubber. The manufacture of cellular polymers is well known. The uncured polymer is generally compounded with vulcanizing chemicals and a blowing agent at a temperature below the decomposition-temperature of the blowing agent. When the polymer compound is heated in the curing cycle, the blowing agent decomposes into a gas which causes gas cells to form. The intumescent granules of this invention would be added to the compound before curing.

As indicated by FIG. 6, these particles also have a heat insulating property making them useful to protect steel beams from reaching temperatures during a fire which might damage the beams and cause them to sag.

Other embodiments of this invention will be apparent to those skilled in the art from the consideration of this specification or practice of the invention disclosed herein. Various omissions, modifications or changes to the principles described herein may be made by one skilled in the art without departing from the true scope and spirit of the invention which is indicated by the following claims.

What is claimed is:

1. An intumescent composition comprising a mixture of alkali metal silicate, represented by the formula $M_2O:xSiO_2$ in which M is the alkali metal; at least one oxy boron compound selected from the group consisting of boric acid and borate salts of Group I and II elements; and water; in which the weight ratio x ranges from about 1.5 to about 4, the molar ratio of boron to M is between about 0.2 and about 0.9, and the water comprises about 5 to 15 weight percent of the total composition.

2. The intumescent composition as recited in claim 1 wherein the alkali metal silicate is selected from the group consisting of sodium silicate, potassium silicate and lithium silicate.

3. The intumescent composition of claim 2 wherein the alkali metal silicate is comprised of sodium silicate.

4. The intumescent composition of claim 3 wherein the oxy boron compound is selected from the group consisting of boric acid, calcium metaborate, sodium borate, zinc borate, and colemanite.

5. The intumescent composition of claim 4 wherein the oxy boron compound is boric acid.

6. The intumescent composition of claim 4 wherein the water comprises about 5 to 10 weight percent of the total composition.

7. The intumescent composition of claim 4 wherein the weight ratio of silica to $Na_2O$ is from about 2 to about 3.75.

8. The intumescent composition of claim 7 wherein the molar ratio of boron to sodium is from about 0.4 to about 0.7.

9. The intumescent composition of claim 4 which includes calcium hydroxide in the mixture.

10. The intumescent composition of claim 4 to which aluminum oxide trihydrate has been added.

11. The intumescent composition of claim 4 which is granulated and in which the granules are coated with a composition comprising a metal salt of a long chain fatty acid.

12. The intumescent composition of claim 4 which is granulated and which is coated with a composition comprising a mixture of a halogenated organic compound which releases halogen when heated to a temperature of less than about 250° C. and an iron containing compound adapted to react with the released halogen to form iron halide.

13. The intumescent composition of claim 4 which further comprises a colorant.

14. A fire retardant intumescable asphaltic roofing material which has the intumescent composition of claim 1 as part of its composition.

15. A sheet material comprising granules of the intumescent composition of claim 1 dispersed in a binder material which softens and chars in the presence of heat.

16. The sheet material of claim 15 in which the binder material is polychloroprene.

17. Polychloroprene foam rubber in which granules of the intumescent composition of claim 1 have been dispersed.

18. Polychloroprene based caulk or putty in which granules of the intumescent composition of claim 1 have been dispersed.

* * * * *

UNITED STATES PATENT AND TRADEMARK OFFICE
CERTIFICATE OF CORRECTION

PATENT NO. : 4,521,333
DATED : June 4, 1985
INVENTOR(S) : Joseph Graham; Timothy J. Gennrich; James A. Laird It is certified that error appears in the above-identified patent and that said Letters Patent is hereby corrected as shown below:

In Column 1, line 36, "proofing" should be --roofing--.

In Column 2, line 27 "borates" should be --oxy boron compounds--

In Column 2, lines 27-28 "oxy boron compound" should be --borate--

Signed and Sealed this

Eighth Day of October 1985

[SEAL]

Attest:

DONALD J. QUIGG

Attesting Officer

Commissioner of Patents and Trademarks—Designate